(12) United States Patent  (10) Patent No.: US 12,568,875 B2
Hodel et al.  (45) Date of Patent: Mar. 10, 2026

(54) SEED FLOW REGULATOR

(71) Applicants: Precision Planting LLC, Tremont, IL (US); AGCO DO BRASIL SA LTDA, Ribeireo Preto (BR)

(72) Inventors: Jeremy J. Hodel, Morton, IL (US); Timothy Kater, Bloomington, IL (US); Tracy Leman, Tremont, IL (US); Jarlis Luiz Matter, Ibirubá (BR)

(73) Assignees: Precision Planting LLC, Tremont, IL (US); AGCO do Brasil Soluções Agrícolas Ltda., Jundiaí (BR)

( * ) Notice: Subject to any disclaimer, the term of this patent is extended or adjusted under 35 U.S.C. 154(b) by 571 days.

(21) Appl. No.: 18/151,572

(22) Filed: Jan. 9, 2023

(65) Prior Publication Data

US 2023/0157202 A1 May 25, 2023

Related U.S. Application Data

(63) Continuation of application No. 16/479,832, filed as application No. PCT/US2018/014824 on Jan. 23, 2018, now Pat. No. 11,596,096.

(60) Provisional application No. 62/449,479, filed on Jan. 23, 2017.

(51) Int. Cl.
*A01C 15/00* (2006.01)
*A01B 73/04* (2006.01)
*A01C 7/08* (2006.01)

(52) U.S. Cl.
CPC ............ *A01C 15/006* (2013.01); *A01B 73/04* (2013.01); *A01C 7/082* (2013.01)

(58) Field of Classification Search
CPC ..... A01C 15/005; A01C 15/006; A01C 7/081; A01C 7/082; A01B 73/02; A01B 73/04; A01B 73/042; A01B 73/048
See application file for complete search history.

(56) References Cited

U.S. PATENT DOCUMENTS

| | | | | |
|---|---|---|---|---|
| 4,286,530 A | * | 9/1981 | Conley | A01C 15/003 |
| | | | | 414/526 |
| 4,758,119 A | * | 7/1988 | Frase et al. | A01C 15/006 |
| | | | | 111/147 |
| 2003/0111000 A1 | * | 6/2003 | Hagen et al. | A01C 7/0445 |
| | | | | 221/211 |

* cited by examiner

*Primary Examiner* — Tara Mayo

(57) ABSTRACT

A mini-hopper for an agricultural row unit that has a fill tube supplying material to a hopper. A backflow preventer is disposed in the fill tube or in a line to the inlet to prevent flow of material from the mini-hopper through the fill tube when the mini-hopper is in a transport position.

4 Claims, 13 Drawing Sheets

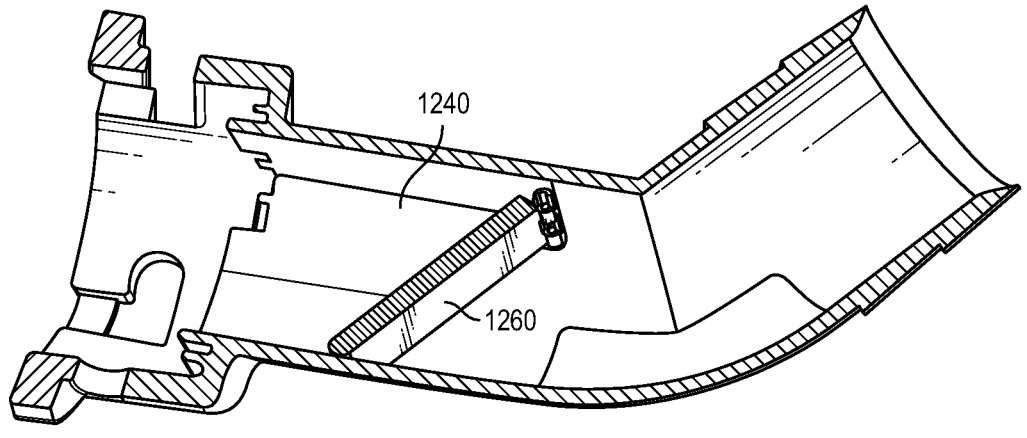
FIG. 14
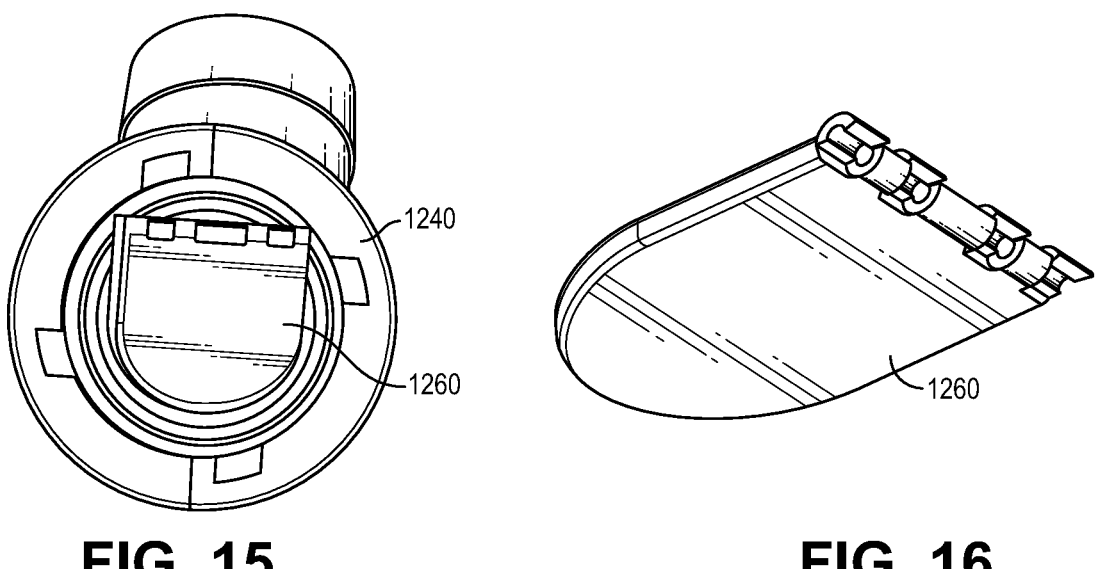
FIG. 15              FIG. 16

SEED FLOW REGULATOR

CROSS-REFERENCE TO RELATED APPLICATIONS

This application is a continuation of U.S. patent application Ser. No. 16/479,832, filed Jul. 22, 2019, which is a national phase entry under 35 U.S.C. § 371 of International Patent Application PCT/US2018/014824, filed Jan. 23, 2018, designating the United States of America and published in English as International Patent Publication WO 2018/136926 A1 on Jul. 26, 2018, which claims the benefit of the filing date of U.S. Provisional Patent Application 62/449,479, filed Jan. 23, 2017, the entire disclosures of each of which are incorporated herein by reference.

TECHNICAL FIELD

Embodiments of the present disclosure relate to implements and application units for seed placement in a trench.

BACKGROUND

Planters are used for planting seeds of crops (e.g., corn, soybeans) in a field. Planters can have any number of desired rows. As the number of rows increases, the width of the planter increases. To allow for transportation of very wide planters, the toolbar of the planter can have sections with the outer sections constituting wings. The wings can be folded up to reduce the width of the planter.

Planters can also have mini-hoppers for storing seeds at each row on the planter. The mini-hoppers are supplied from a main hopper on the row unit with supply lines transferring seed from the main hopper to the mini-hoppers.

With mini-hoppers on rows that are on the wings, when the wings are folded up, the seeds in the mini-hoppers drain out of the mini-hoppers and back into the supply lines.

BRIEF DESCRIPTION OF THE DRAWINGS

The present disclosure is illustrated by way of example, and not by way of limitation, in the figures of the accompanying drawings and in which:

FIG. 14 illustrates a side view of an inlet tube having a backflow preventer in accordance with one embodiment.

FIG. 15 illustrates an end view of an inlet tube having a backflow preventer in accordance with one embodiment.

FIG. 16 illustrates a perspective view of a backflow preventer in accordance with one embodiment.

BRIEF SUMMARY

Figure 1:
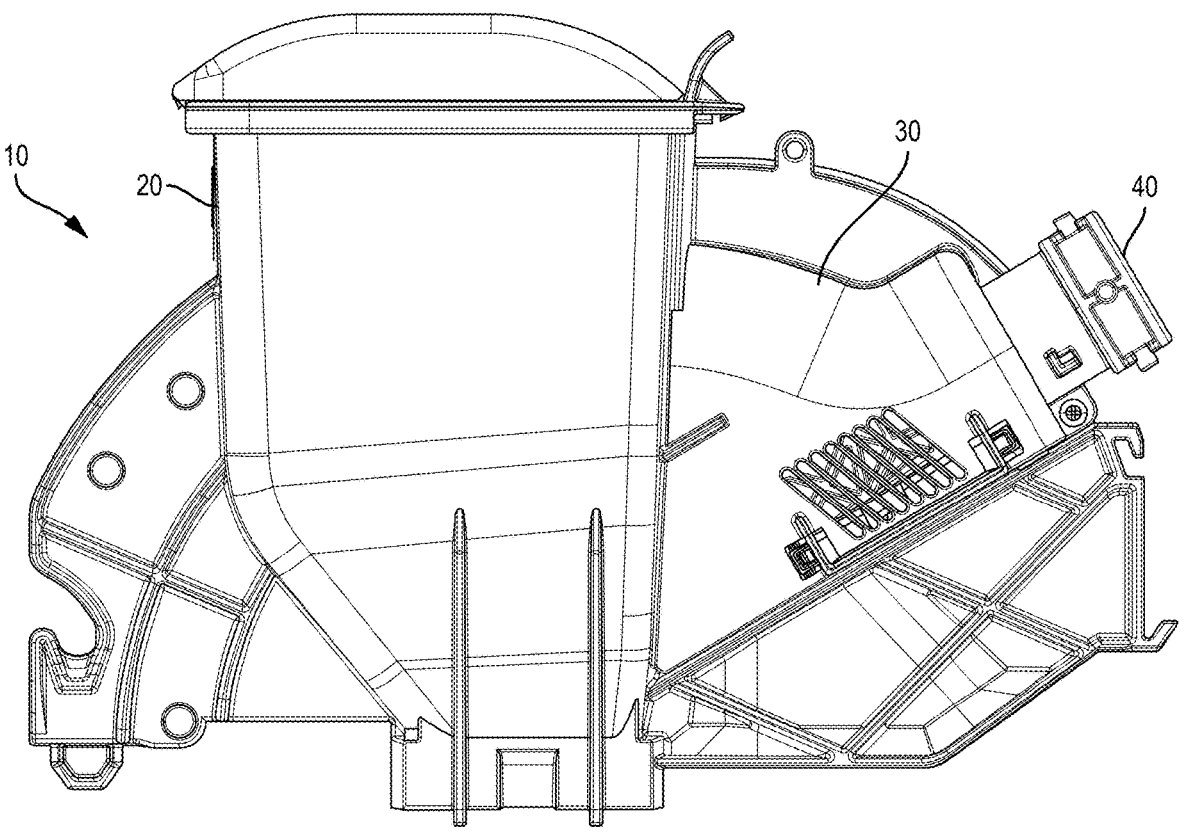
FIG. 1 shows a side view of mini-hopper according to one embodiment.
Figure 2:
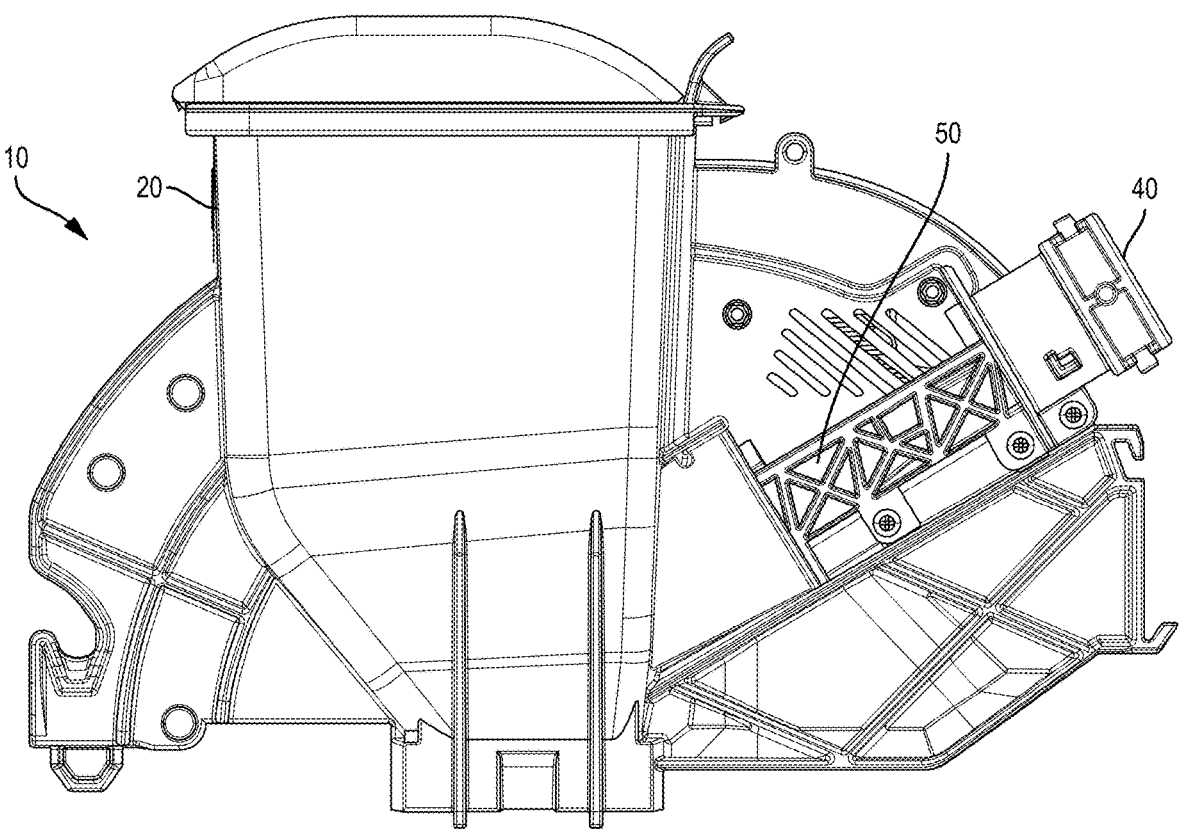
FIG. 2 shows a side view of the mini-hopper of FIG. 1 with the fill tube cover removed for viewing the fill tube.
Figure 3:
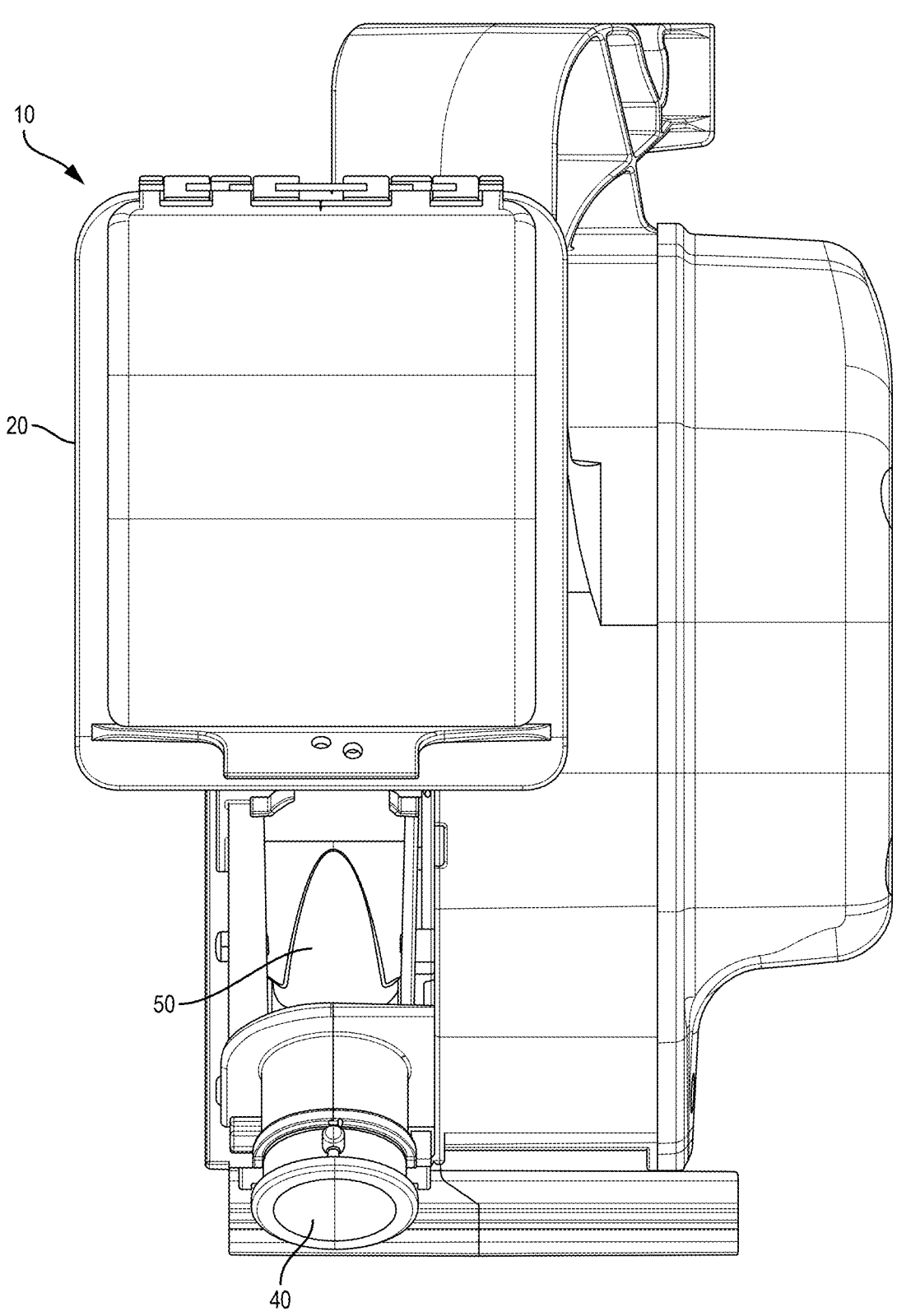
FIG. 3 shows a top plan view of the mini-hopper of FIG. 2.
Figure 4:
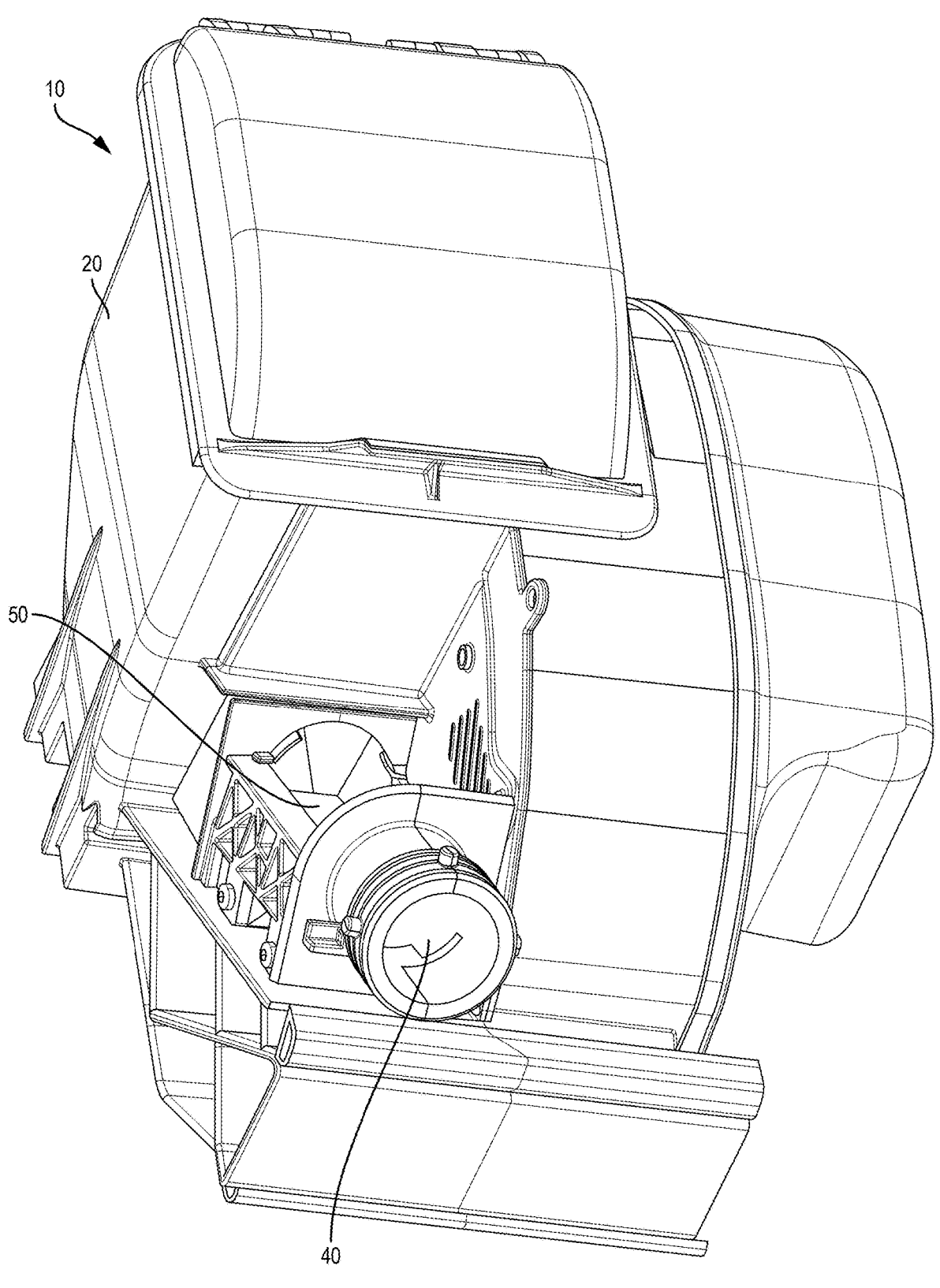
FIG. 4 shows a perspective view of the mini-hopper of FIG. 2.
Figure 5:
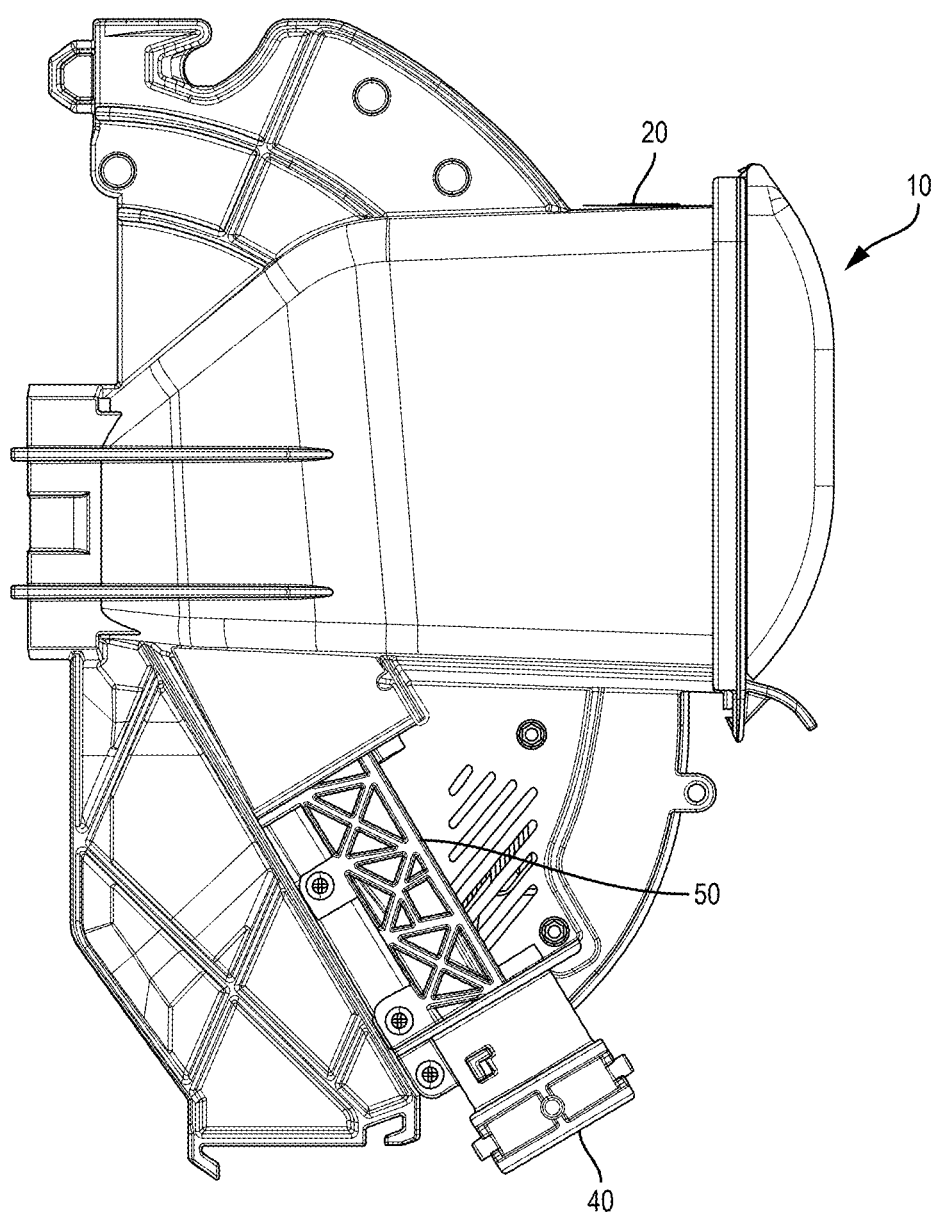
FIG. 5 shows a side view of the mini-hopper of FIG. 2 rotated to transport position when mounted on a wing.

Back flow prevention of material on a mini-hopper is disclosed herein.

DETAILED DESCRIPTION

Illustrated in FIGS. 1 to 5 is a mini-hopper 10. Mini-hopper 10 includes a hopper 20, a fill tube cover 30, a tube inlet 40, and fill tube 50. As viewed in FIG. 5, mini-hopper 10 is in a transport position. Material, such as seeds, will flow under gravity out of hopper 20 through fill tube 50 and out tube inlet 40.

Figure 6:
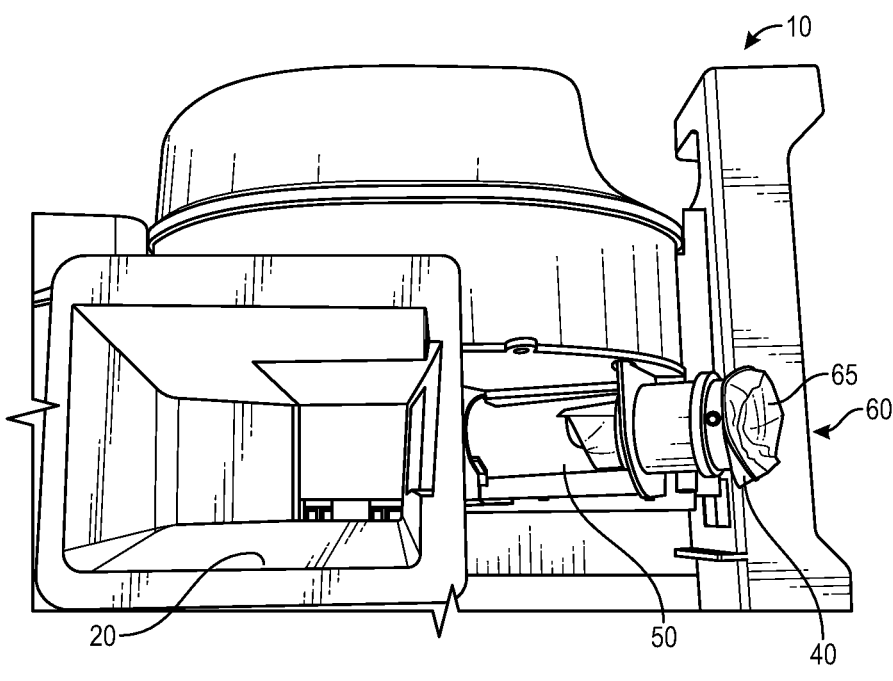
FIG. 6 is a top plan view of the mini-hopper of FIG. 2 with an elastomeric sheet material disposed in the fill tube according to one embodiment.

Mini-hopper 10 further includes a backflow preventer 60 as illustrated in FIG. 6.

In one embodiment, backflow preventer 60 is an elastomeric member 62, which can be disposed in fill tube 50. Elastomeric member 62 has a flexibility that allows elastomeric member 62 to open to allow flow into fill tube 50 to hopper 20, and elastomeric member 62 will close or collapse to prevent gravitational flow from hopper 20 through fill tube 50.

In one embodiment, elastomeric member 62 is a self-opening elastomeric valve that opens when a desired amount of pressure difference across the valve is applied. Examples of elastomeric valves include, but are not limited to, duckbill valves, dome valves, cross-slit valves, and slit valves.

Figure 7:
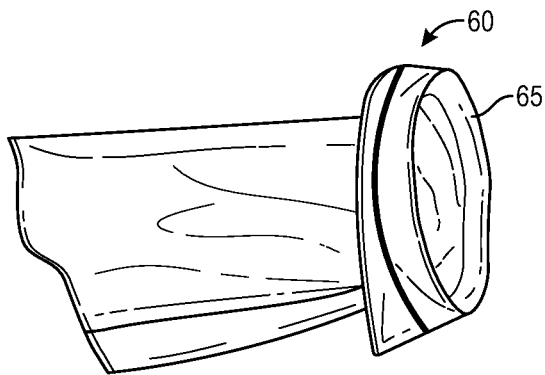
FIG. 7 is a perspective view of the elastomeric sheet material of FIG. 6.
Figure 8:
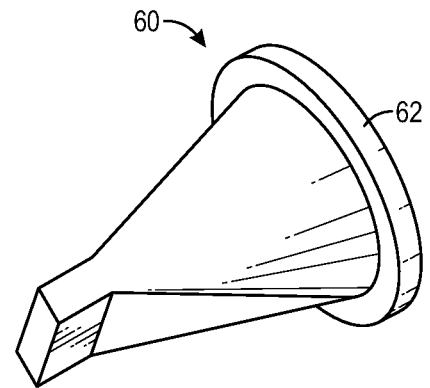
FIG. 8 is an embodiment of an elastomeric member being a duckbill valve.

In another embodiment, backflow preventer 60 can be an elastomeric sheet material 65 that can be disposed about tube inlet 40 and into fill tube 50 without attaching to fill tube 50. FIG. 6 illustrates elastomeric sheet material 65 disposed about tube inlet 40 and into fill tube 50. FIG. 7 illustrates elastomeric sheet material 65. Elastomeric sheet material 65 permits flow from tube inlet 40 into fill tube 50 to hopper 20, but elastomeric sheet material will collapse to prevent flow from fill tube 50 to tube inlet 40.

Figure 9:
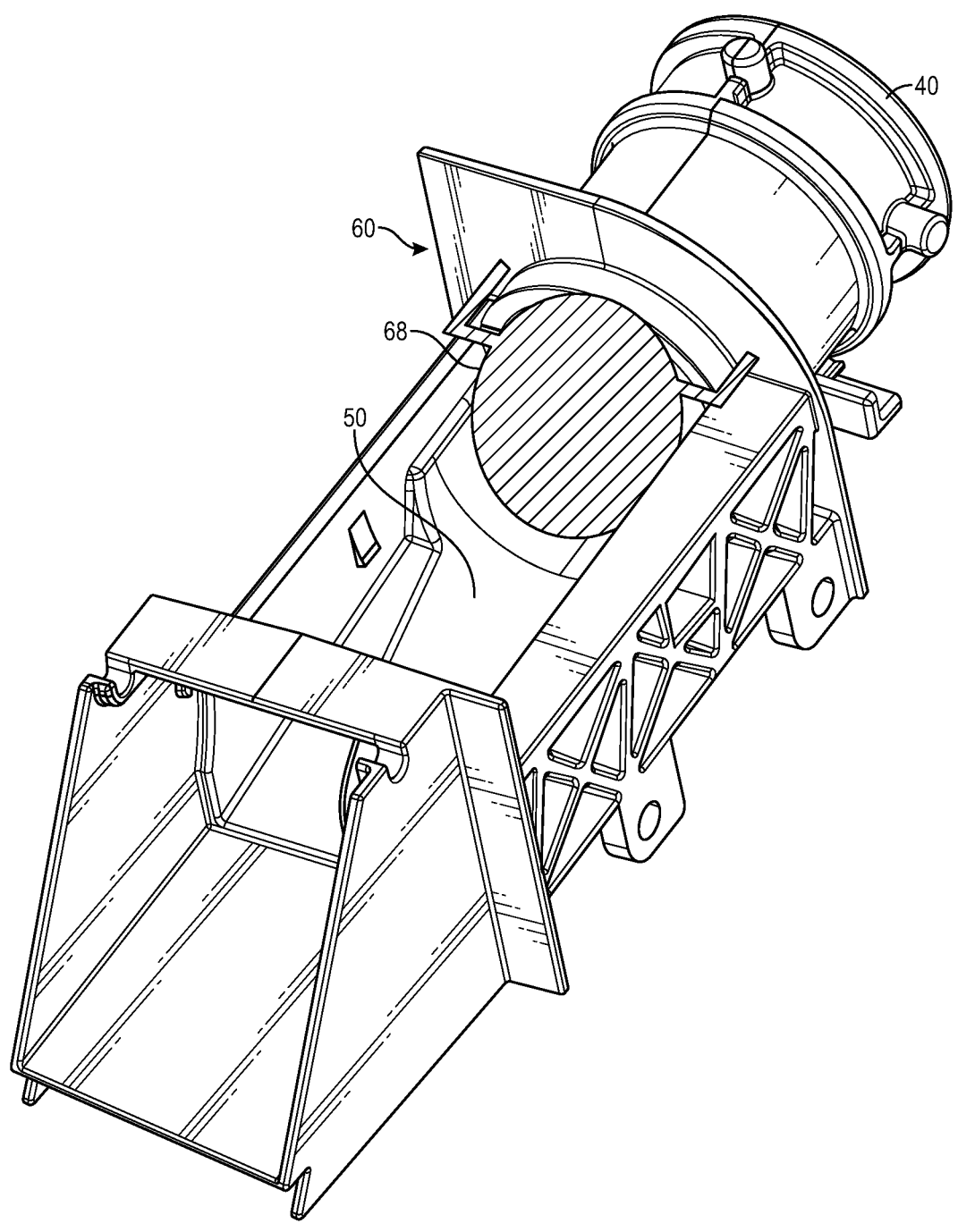
FIG. 9 is a perspective view of the fill tube from FIG. 2 and including a flap gate according to one embodiment.

In another embodiment, backflow preventer 60 can be a flap 68, such as a flap gate illustrated in FIG. 9. Flap 68 is pivotably disposed in fill tube 50 to open when flow is from tube inlet 40 to hopper 20 and close under gravity when mini-hopper 10 is raised to the transport position.

Figure 10:
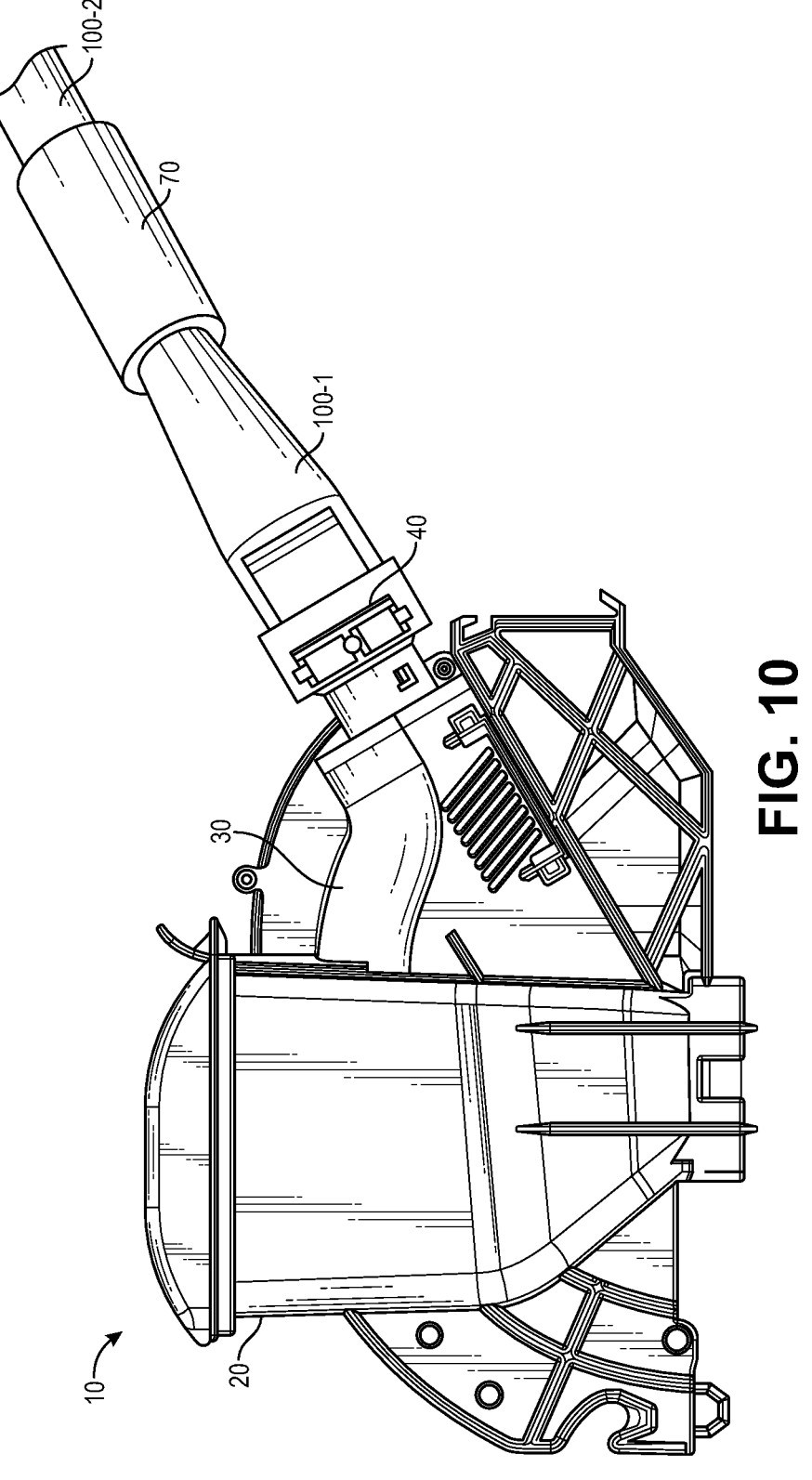
FIG. 10 is a side view of the mini-hopper of FIG. 1 and further including a flexible member in the inlet line to the tube inlet according to one embodiment.
Figure 11:
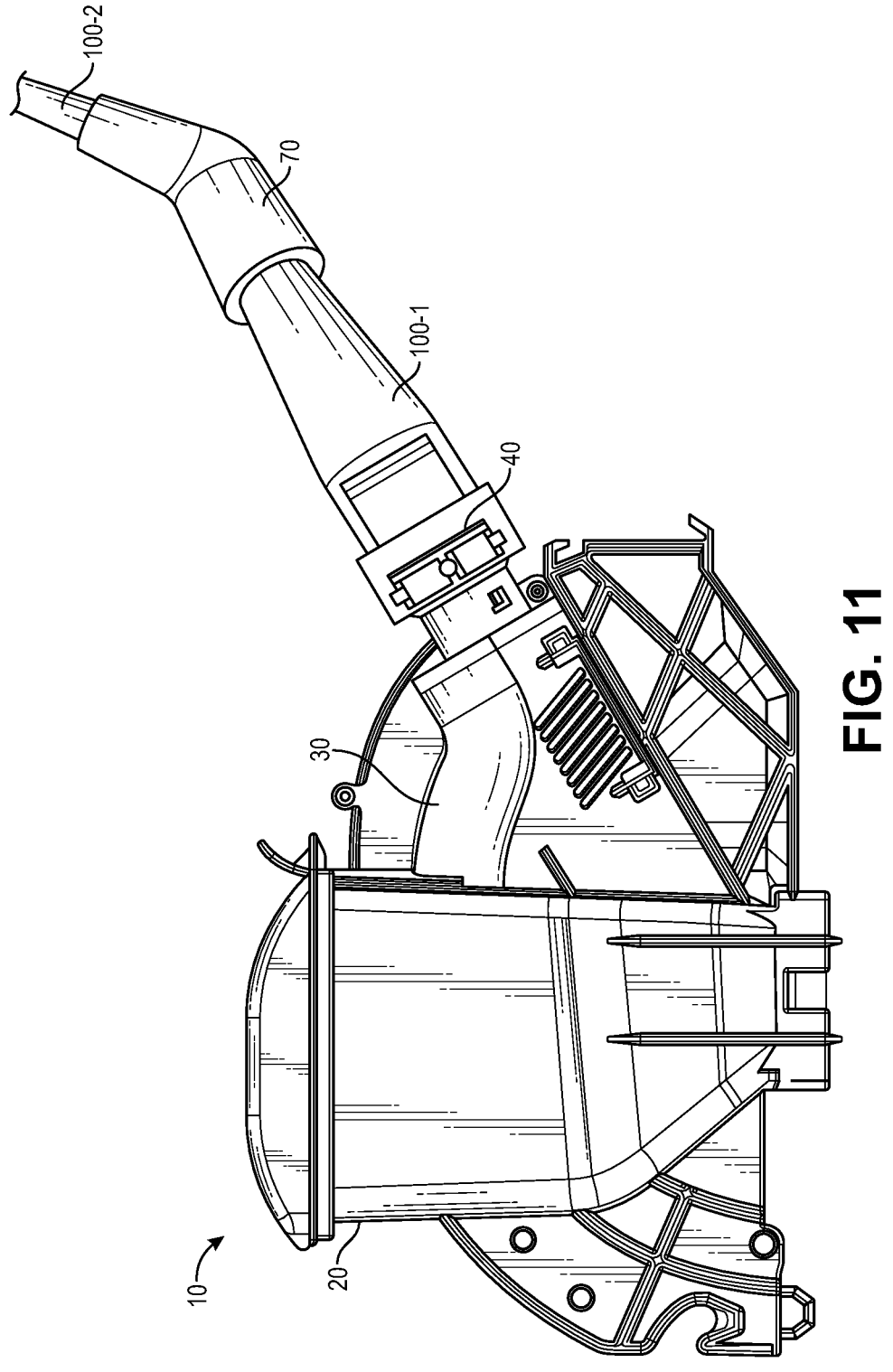
FIG. 11 is a side view of the mini-hopper of FIG. 10 with the flexible member in a flexed position closing flow.

In another embodiment illustrated in FIGS. 10 and 11, inlet line 100 with first line section 100-1 and second line section 100-2 is connected to the tube inlet 40. Disposed between first line section 100-1 and second line section 100-2 is flexible member 70. FIG. 10 illustrates flexible member 70 in an unflexed state permitting flow. FIG. 11 illustrates flexible member 70 in a flexed state blocking flow. Flexible member 70 flexes to the blocked state when mini-hopper 10 is in the transport position.

Figure 12:
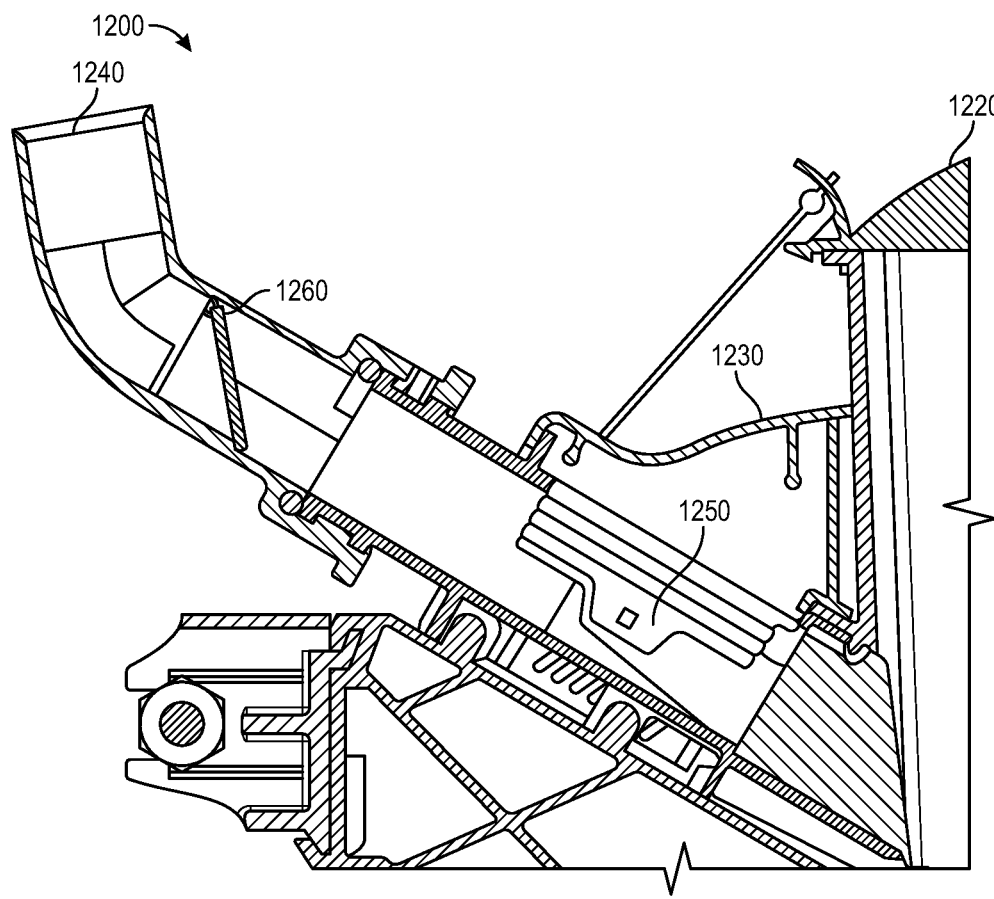
FIGS. 12 and 13 illustrate a mini-hopper 1200 in accordance with another embodiment.
Figure 13:
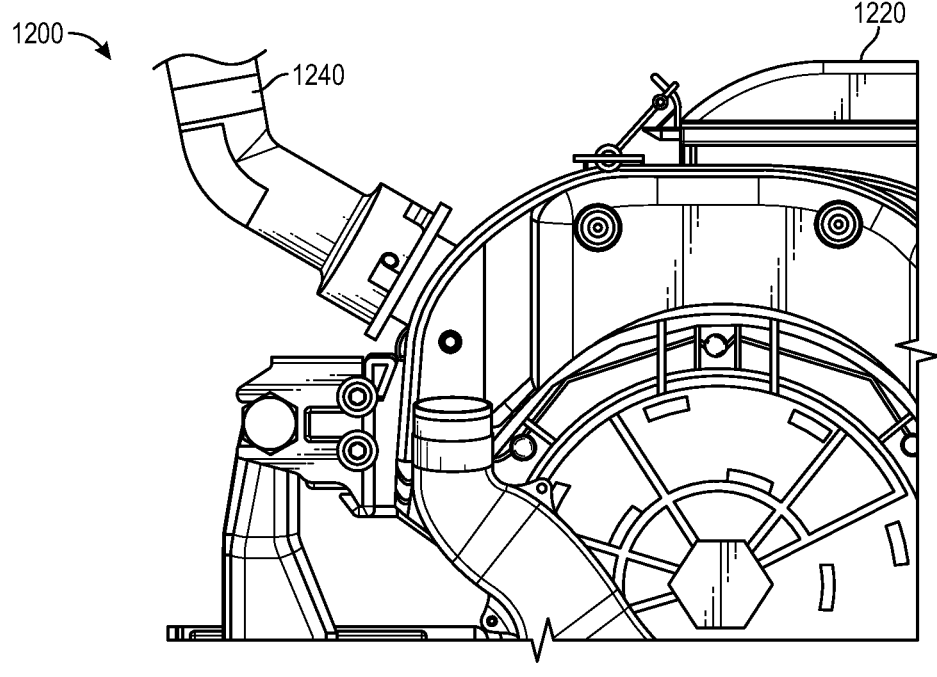

Illustrated in FIGS. 12 and 13 is a mini-hopper 1200 in accordance with another embodiment. The mini-hopper 1200 includes a hopper 1220, a fill tube cover 1230, a tube inlet 1240, and fill tube 1250. Backflow preventer 1260 can be a flap, such as a flap gate 1260 illustrated in FIGS. 14-16. The backflow preventer 1260 is pivotably disposed in tube inlet to open when flow is from tube inlet 1240 to hopper 1220 and close under gravity when mini-hopper 1210 is raised to the transport position.

Figure 17:
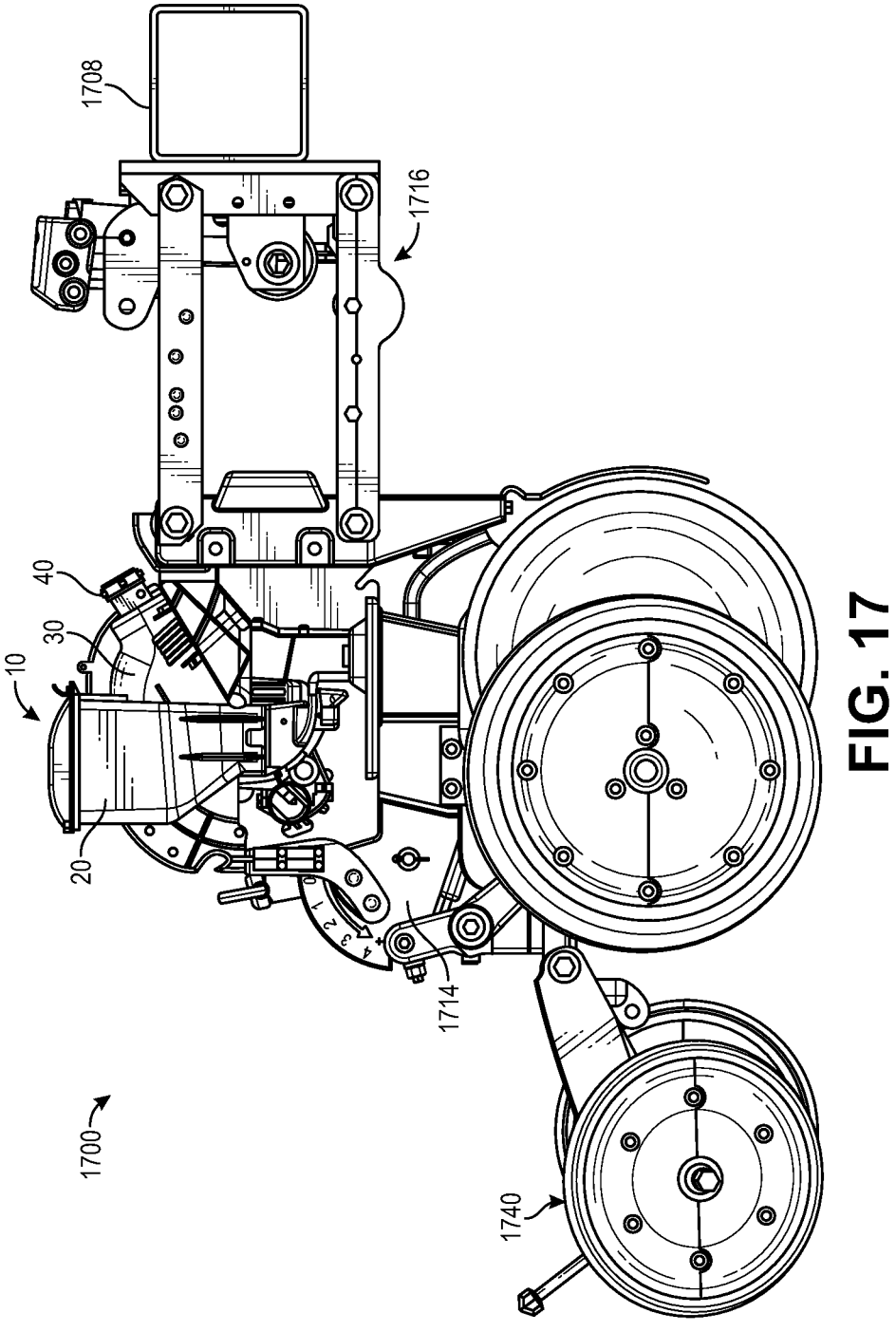
FIG. 17 illustrates a single row unit 1700 of a row crop planter in accordance with one embodiment.

FIG. 17 illustrates a single row unit 1700 of a row crop planter in accordance with one embodiment. The row units are mounted in spaced relation along the length of a transverse toolbar 1708 by a parallel linkage 1716 which permits each row unit to move vertically independently of the toolbar and the other spaced row units in order to accommodate changes in terrain or upon the row unit encountering a rock or other obstruction as the planter is drawn through the field. Each row unit includes a frame 1740 which operably supports a seed mini-hopper 10, a furrow opening assembly, a seed meter, a seed tube, and a furrow closing assembly 1740.

Mini-hopper 10 includes a hopper 20, a fill tube cover 30, a tube inlet 40, and fill tube. As viewed in FIG. 17, mini-hopper 10 is aligned horizontally with a ground surface in a working position for dispensing seed.

Figure 18:
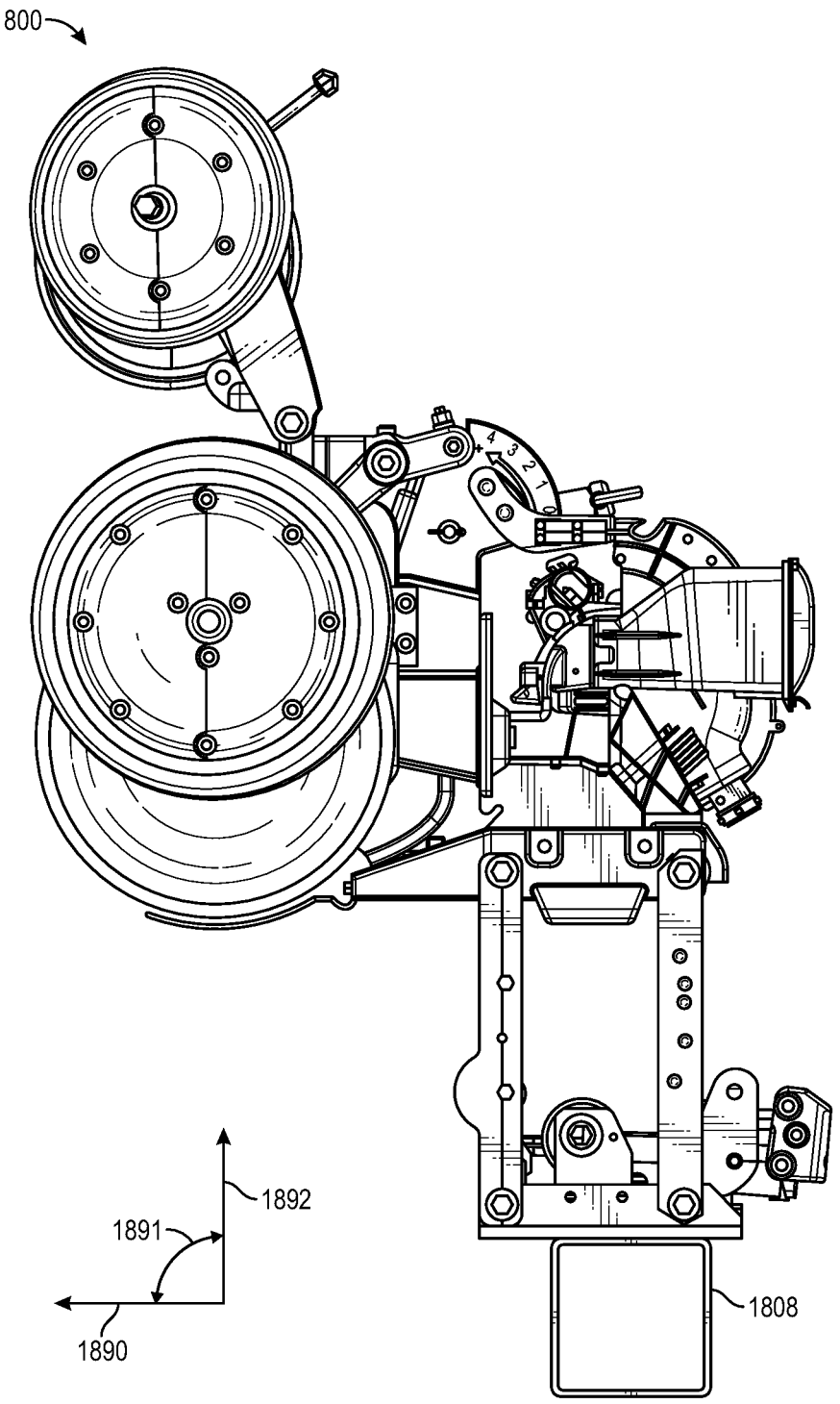
FIG. 18 illustrates a single row unit 1800 of a row crop planter in accordance with another embodiment.

FIG. 18 illustrates a single row unit 1800 of a row crop planter in accordance with another embodiment. The row unit 1800 includes similar components in comparison to the row unit 1700 of FIG. 17. However, the row unit 1800 is tilted with respect to a ground surface in a transport position for transportation of the row unit. A backflow preventer as described herein prevents material, such as seeds, from flowing under gravity out of hopper 20 through fill tube 50 and out tube inlet 40.

The row unit 1800 can be tilted by any angle 1891 (e.g., 0-90 degrees) from a ground reference 1890 to a tilted direction 1892.

What is claimed is:

1. A row unit of a planter comprising:
   a frame configured to rotate between an operating position and a transport position;
   a hopper supported by the frame;
   an inlet connected to the hopper;
   a fill tube supplying the hopper via the inlet, wherein the fill tube is vertical with respect to the ground when the frame is in the transport position and the fill tube is angled from vertical with respect to the ground when the frame is in the operating position; and
   a backflow preventer movably coupled within the fill tube, the backflow preventer comprising a flap that closes the fill tube when the frame is in the transport position to prevent flow from the fill tube to the inlet.

2. The row unit of claim 1, wherein the flap is pivotably disposed in the fill tube to open when flow is from the inlet to the hopper.

3. The row unit of claim 1, wherein the flap is pivotably disposed in the fill tube to close under gravity when the row unit is raised to a transport position.

4. The row unit of claim 1, wherein the flap comprises a self-opening valve that opens when a desired amount of pressure difference across the valve is applied.

* * * * *